D. P. Foster,
Saw-Set,
Nº 33,063. Patented Aug. 13, 1861.
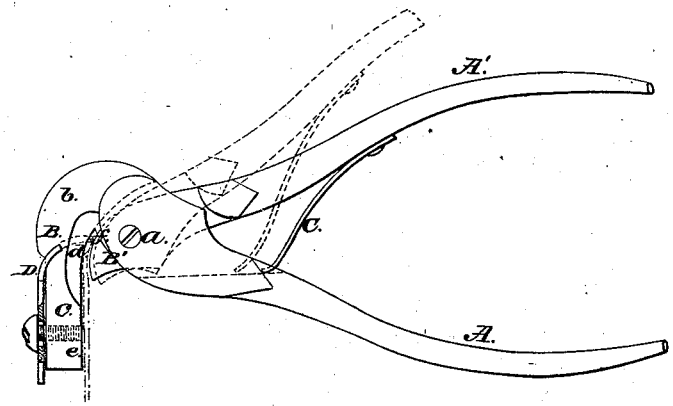
Witnesses.
J W Coomly
G W Reed
Inventor.
D P Foster
per Munn & Co
Attorneys

UNITED STATES PATENT OFFICE.

D. P. FOSTER, OF SHELBURNE FALLS, MASSACHUSETTS, ASSIGNOR TO HIMSELF, AND S. L. HILL, OF FLORENCE, MASSACHUSETTS.

SAW-SET.

Specification of Letters Patent No. 33,063, dated August 13, 1861.

*To all whom it may concern:*

Be it known that I, D. P. FOSTER, of Shelburne Falls, in the county of Franklin and State of Massachusetts, have invented a new and Improved Saw-Set; and I do hereby declare that the following is a full, clear, and exact description of the same, reference being had to the annexed drawing, making a part of this specification, said drawing being a side view of my invention.

This invention consists in having two jaws provided with suitable handles which cross each other and are connected by a fulcrum pin, one of the jaws having a convex face, and the other being correspondently concave, substantially as hereinafter described, whereby the teeth of the saw will be set in curved form and saws of different thicknesses set with one and the same implement.

To enable those skilled in the art to fully understand and construct my invention I will proceed to describe it.

A A' represent two handles, one of which A' passes through the other A, the two handles being connected by a fulcrum pin *a*. The handles A A' are provided respectively with jaws B B'. The outer jaw B of the handle A is formed of a curve *b* and a tangent *c*. The inner side of the curve *b*, as shown at *d*, is the face side of the jaw and is but slightly concave, while the inner side *e* of the part *c* forms the bearing surface for the saw while being set.

The jaw B' is of curved form, that is to say, convex at its face side, and corresponds inversely with the face *d* of the jaw B, as shown clearly in the drawing.

Between the two handles A A' there is a spring C, which has a tendency to keep the jaws distended, and to the outer side of the part C of the jaw B there is attached a gage D. This gage is simply a plate which extends up at one side of the jaw B, as shown at *f*, for the edge of the saw teeth to bear against.

In the drawing a transverse section of the saw is shown in red. The way in which the implement is used will be readily seen. The jaws B B' grasp the teeth of the saw, and in consequence of the operator pressing the handles A A' together the teeth are set with a curve conforming of course to the curvature of the two jaws B B'. By this arrangement one and the same implement may be used for saws of different thicknesses, and operate equally well in all cases, and by having the teeth set with a curve they are not so liable to be broken as when set with an abrupt angle with the ordinary sets.

If desired a set screw may be fitted transversely in the part *c*, of the jaw near the point occupied by the screw *g*, which secures the gage D to the jaw B. By adjusting this set screw more or less set may be given the teeth. This set screw arrangement is used in the majority of saw sets and is a well known device. It is only necessary in those cases where a great variation in the set of the teeth is required, and forms no part of the invention.

Having thus described my invention what I claim as new and desire to secure by Letters Patent is—

The two jaws B B', one, B, being formed of a curve *b*, and a tangent *c*, with a concave face side *d*, and the other jaw B' formed with a convex face corresponding inversely with the face *d* of jaw B, all being arranged substantially as shown to form a new and improved implement for the purpose set forth.

D. P. FOSTER.

Witnesses:
J. S. HALLIGAN,
N. S. TALMADGE.